(12) United States Patent
Idzik et al.

(10) Patent No.: US 7,655,901 B2
(45) Date of Patent: Feb. 2, 2010

(54) LIGHT ASSISTED KEYBOARD FOR MOBILE COMMUNICATION DEVICE

(75) Inventors: Jacek S. Idzik, Kenilworth (CA); Robert J. Lowles, Waterloo (CA)

(73) Assignee: Research in Motion Limited, Waterloo, ON (CA)

( * ) Notice: Subject to any disclaimer, the term of this patent is extended or adjusted under 35 U.S.C. 154(b) by 0 days.

(21) Appl. No.: 11/281,490

(22) Filed: Nov. 18, 2005

(65) Prior Publication Data

US 2007/0114368 A1    May 24, 2007

(51) Int. Cl.
*G01J 1/36* (2006.01)
*G06M 7/00* (2006.01)

(52) U.S. Cl. .................. 250/227.22; 250/221

(58) Field of Classification Search ............ 250/227.11, 250/227.12, 227.14, 227.21, 227.22, 227.24, 250/221, 216; 341/22–34; 345/168–182; 400/472–496; 380/52; 463/37

See application file for complete search history.

(56) References Cited

U.S. PATENT DOCUMENTS

| | | | | |
|---|---|---|---|---|
| 3,372,789 A | * | 3/1968 | Heinz et al. | 400/479 |
| 3,526,775 A | * | 9/1970 | Friedrich et al. | 250/221 |
| 3,621,268 A | * | 11/1971 | Friedrich et al. | 250/214.1 |
| 3,937,952 A | | 2/1976 | Ripley et al. | |
| 4,311,990 A | * | 1/1982 | Burke | 341/31 |
| 4,323,888 A | * | 4/1982 | Cole | 341/34 |
| 4,405,197 A | | 9/1983 | Bejczy | |
| 5,677,688 A | | 10/1997 | O'Mara et al. | |
| 6,525,677 B1 | * | 2/2003 | Printzis | 341/31 |
| 6,611,252 B1 | | 8/2003 | Dufaux | |
| 6,904,326 B2 | | 6/2005 | Lopez et al. | |
| 2003/1193479 | | 10/2003 | Dufaux | |
| 2005/0161583 A1 | * | 7/2005 | Matsumoto | 250/208.1 |
| 2008/0142686 A1 | * | 6/2008 | Konno et al. | 250/208.1 |

FOREIGN PATENT DOCUMENTS

GB    2406944    4/2005

OTHER PUBLICATIONS

Puppeteer, Infrared Switch, www.ipuppeteer.com/products/infrared.html, Copyright May 2002 Ansae Ltd.
Canadian Intellectual Property Office, Office Action for Canadian Patent Application No. 2568380, Sep. 8, 2009.

* cited by examiner

*Primary Examiner*—Georgia Y Epps
*Assistant Examiner*—Pascal M Bui-Pho
(74) *Attorney, Agent, or Firm*—Borden Ladner Gervais LLP; Jeffrey W. Wong

(57) ABSTRACT

A mobile communication device having a keyboard with a set of keys representing alpha-numeric characters, the keyboard comprising a light source, located within said mobile communication device; for providing a light; a set of sensors, associated with said keys, for sensing an amount of said light in a vicinity of each of said set of sensors, to determine which of said set of keys has been selected; and a transparent flat cover, overlying said set of sensors, displaying said set of alpha-numeric characters, for associating said set of alpha-numeric characters with said set of sensors.

15 Claims, 6 Drawing Sheets

LIGHT ASSISTED KEYBOARD FOR MOBILE COMMUNICATION DEVICE

FIELD OF THE INVENTION

The invention relates generally to mobile communication devices. More particularly, the invention relates to a keyboard for use with a mobile communication device.

BACKGROUND OF THE INVENTION

The use of mobile communication devices is growing steadily as technology improves. Many individuals now own and use mobile communication devices on a daily basis. These mobile communication devices are typically easy to use and portable. However, there is a push to develop lighter mobile communication devices so that users are not weighed down when carrying their device. This is especially important when a user attaches the mobile communication device to their belt, or puts it in their pocket, or purse.

In some prior art devices, the weight of the keyboard/keypad is a large percentage of the overall weight of the device due to the many switches and parts which form the keyboard/keypad. These switches and parts, also increase the overall thickness of the mobile communication device which detracts from its portability. Furthermore, the cost to manufacture and implement the set of electrical/mechanical switches and parts is quite expensive and complicated.

The long term reliability of mechanical switches in the keyboard/keypad, is quite problematic as the switches are not dependable and generally require constant repair. Moreover, since keyboards/keypads in mobile communication devices are generally not sealed, dirt, dust, liquids, moisture and ESD (electrostatic discharge) may enter the mobile communication device which causes the switches to provide intermittent input of data and commands.

It is, therefore, desirable to provide a novel keyboard/keypad for a mobile communication device.

BRIEF DESCRIPTION OF THE DRAWINGS

Embodiments of the invention will now be described, by way of example only, with reference to the attached Figures, wherein.

DETAILED DESCRIPTION

Generally, the invention provides a keyboard/keypad for a mobile communication device. As the terms keyboard and keypad are typically interchangeable when discussing a mobile communication device in this application, the term keyboard will be used to describe both a keyboard and/or a keypad in the following description.

Figure 1A:
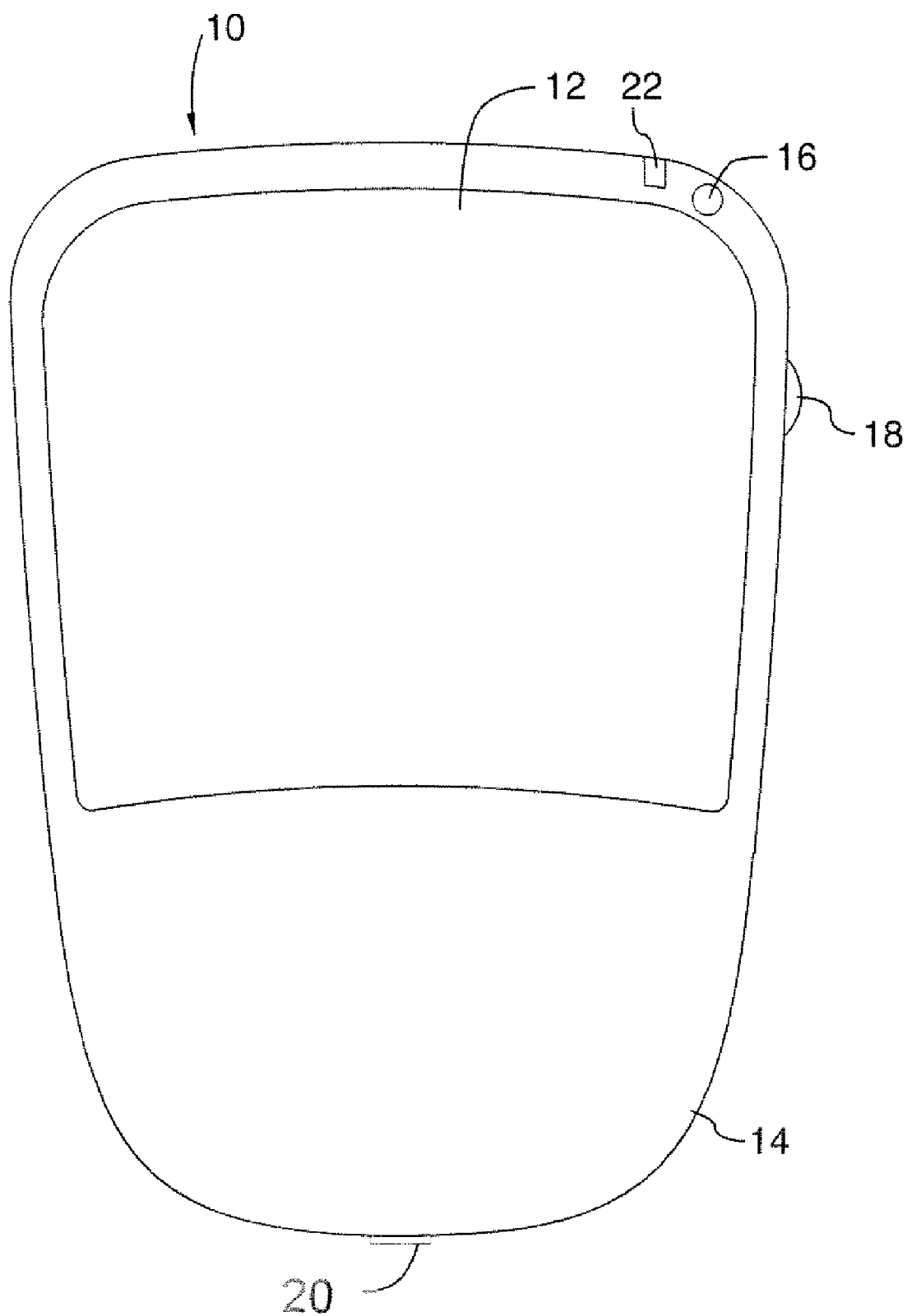
FIG. 1a is a schematic diagram of a prior art mobile communication device.

Turning to FIG. 1a, a schematic diagram of a prior art mobile communication device is shown. The mobile communication device 10 comprises a display area 12, a keyboard area 14 for receiving a keyboard, a power button 16, a thumbwheel 18 and a communication port 20. The communication device 10 further comprises an indicator lamp 22 which indicates when a new message is received by the device 10. The functionality of these parts will be well known to one skilled in the art. The keyboard area 14 typically includes a plurality of individual keys representing alpha-numeric characters.

Figure 1B:
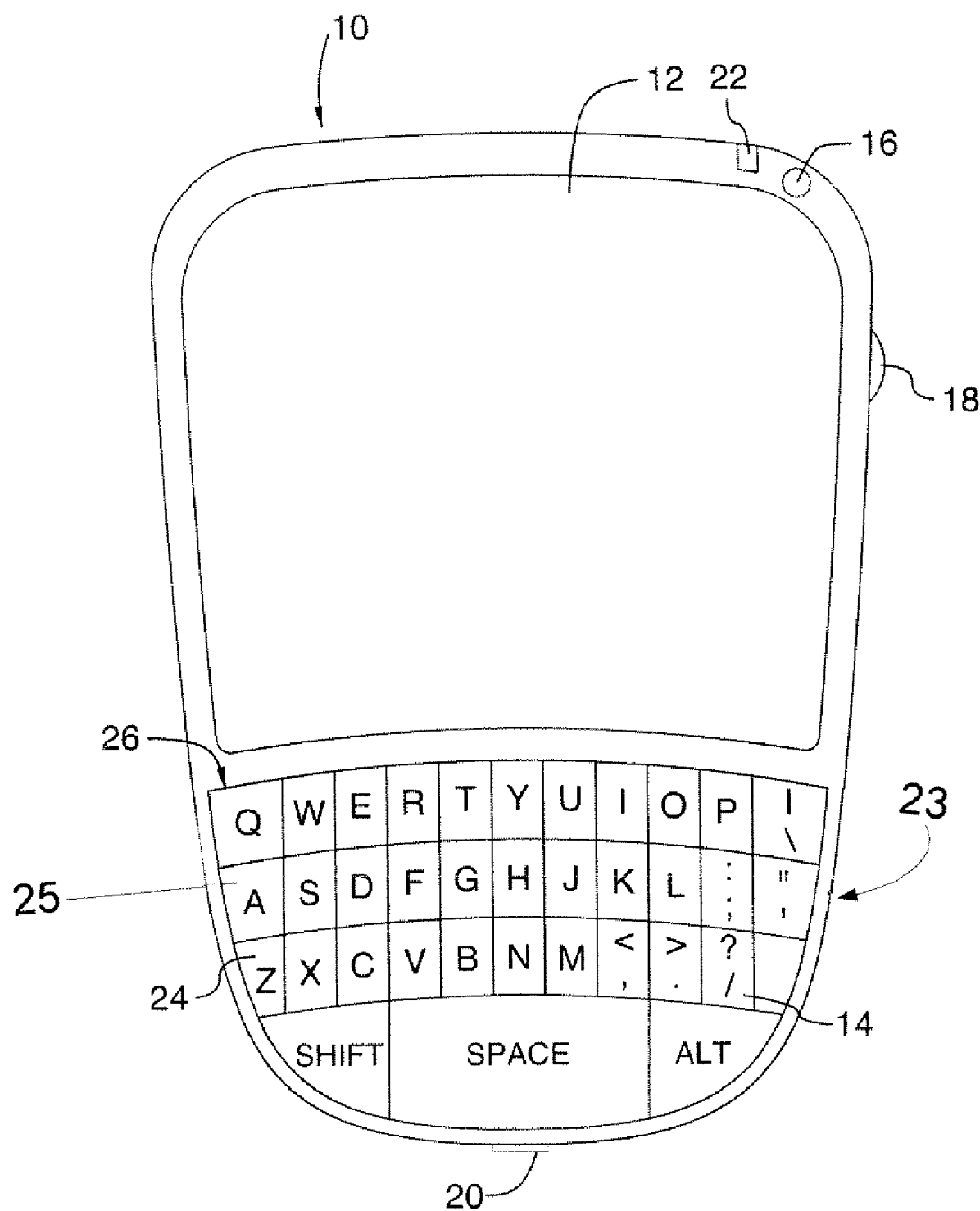
FIG. 1b is a schematic diagram of a first embodiment of a keyboard installed in a mobile communication device.

Turning to FIG. 1b, a schematic diagram of a mobile communication device, or handheld electronic device, comprising a light source keyboard 23 is shown.

In this embodiment, keyboard lettering 24, outlining alphabetic or alphanumeric keys 25, is provided on a transparent sheet 26 which lies over the keyboard area 14, sealing the keyboard area so that foreign objects, such as dust, dirt or ESD, may not enter the mobile communication device 10. The keyboard lettering 24 is printed on the top surface of the transparent sheet 26 to simulate the presence of a keyboard. In use, a user simply presses, or places their finger over, one of the keys 25 in order to activate the keys as would be required when typing on a keyboard. It will be understood that the design or look of the keyboard is determined by the designer and that various keyboard patterns may be contemplated. The operation of the keyboard is not affected by the different keyboard designs or layouts such as a QWERTY, QWERTZ, AZERTY, QZERTY or other language keyboards.

Figure 2:
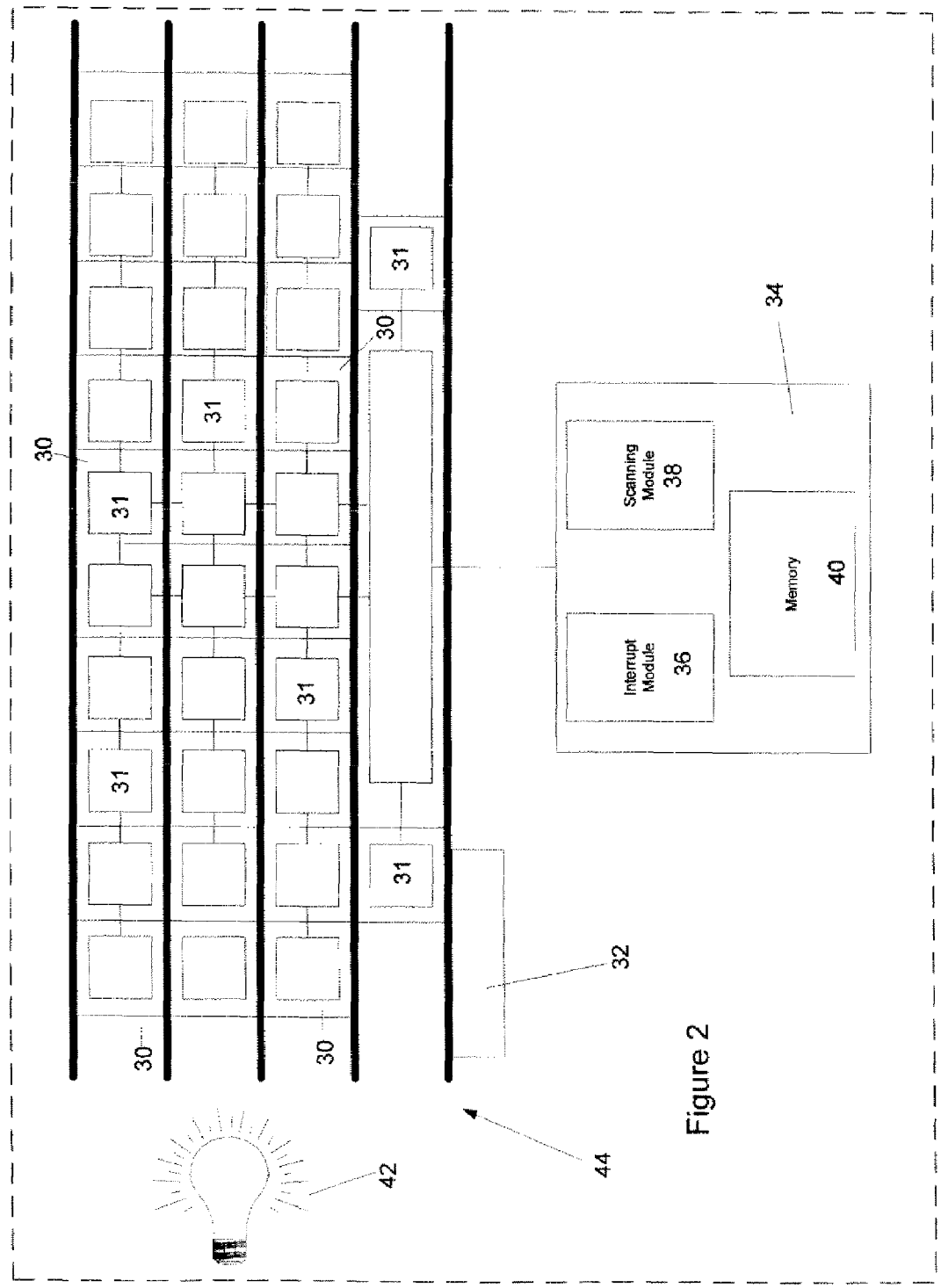
FIG. 2 is a schematic diagram of a portion of a keyboard.

FIG. 2 provides a schematic view of a keyboard within the mobile communication. The mobile communication device 10 further comprises a light source 42, preferably an infra-red light source, which provides the necessary light for operation of the keyboard (as will be described in more detail below) along with a set of infra-red sensors 30, each associated with one of the keys 25 of the keyboard and a piezo-transducer 32 which is associated with the set of infra-red sensors 30 to provide a tactile response to the user when they press the key. By having only a single transducer, this assists in decreasing the size and weight of the device and helps the simplicity of the internal set up of the device.

Each of the sensors 30 includes a corresponding filter 31, preferably a bandpass filter, which assists in sensing the light from the light source 42. Each bandpass filter 31 is preferably separate from, but associated and in communication, with one of the set of sensors 30. However, the bandpass filter 31 and the sensor 30 may also be provided as a sensor and bandpass filter combination. In the preferred embodiment, by using a bandpass filter, only selected frequencies of the infra-red light are sensed by the sensors 30 and ambient light does not interfere with the readings of the sensors 30.

Each of the rows of sensors are located in a light pipe 44 which receives the light from the light source 42 and directs the light towards each of the sensors 30 which are preferably connected to, and in communication with, a processor 34 (within the mobile communication device 10) which processes the keys which are being pressed. The processor 34 preferably comprises an interrupt module 36, a scanning module 38 and a memory 40.

Figure 3:
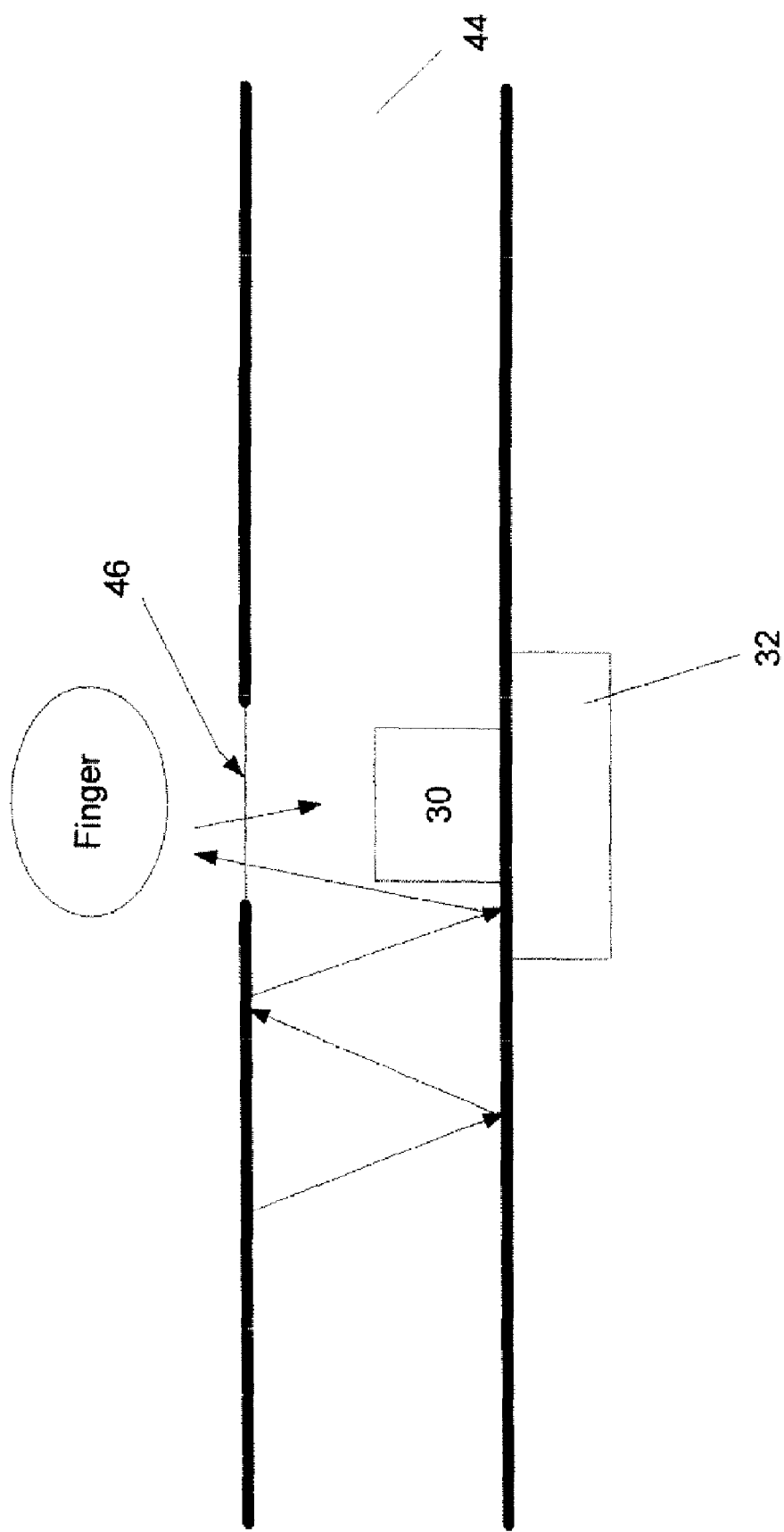
FIG. 3 is a schematic diagram of light travelling in the keyboard.

As shown in FIG. 3, in operation, infra-red light from the light source 42 is transmitted along the light pipe 44 and is reflected off the light pipe 44 by bouncing off the bottom of the keyboard (cover 26) and the borders of the keys until the light reaches an opening 46 (which represent the keys 25 of the keyboard 23).

The sensor 30 located underneath each of the openings sense the amount of infra-red light in its immediate vicinity as the ambient light is filtered out by the bandpass filters 31. When there is no finger of object covering the opening, the sensor 30 only senses an expected, or default, value of light and therefore concludes that the key associated with the sensor 30 has not been selected. It will be understood that each of the sensors has a threshold infra-red light value (representing the expected value) but once this threshold is passed (indicating the presence of a finger), the sensor transmits a signal, such as an interrupt signal, to the processor 34.

When a finger is placed over the opening 46, the presence of the finger deflects the infra-red light towards the sensor 30 so that the sensor 30 senses the increase of infra-red light (above the threshold value). Each time a key is pressed, the piezo-transducer 32 provides a tactile response to the user to recognize that a key has been pressed.

Figure 4A:
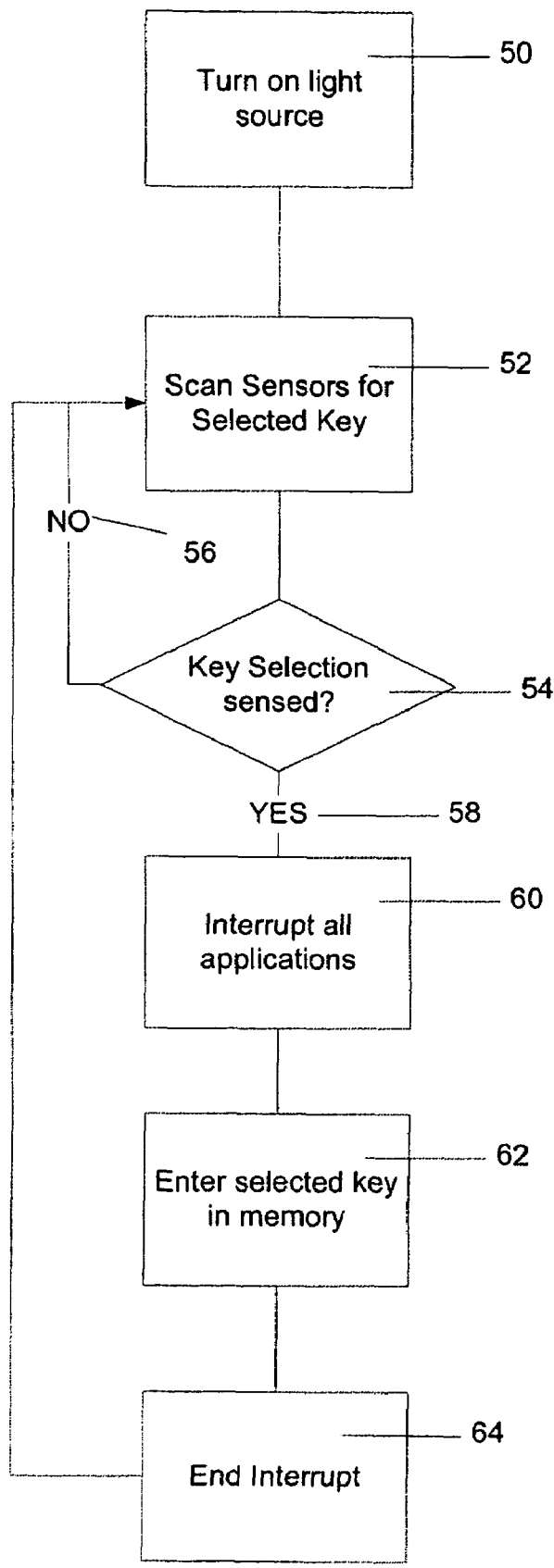
FIG. 4a is a flowchart of a first embodiment of a method of using the keyboard of FIG. 2.

Turning to FIG. 4a, a first method of operation of the keyboard is shown. In this embodiment, once the mobile communication device is turned on, the light source 42 turns on and transmits light, preferably infra-red through the light pipe 44 (step 50). It will be understood by one skilled in the art that the infra-red light is modulated from 20 to 40 khz from the source 42 in order to distinguish the infra-red light from ambient light. Simultaneously, the processor 34 proceeds to scan the sensors 30 (via the scanning module 38) to determine if any one of the sensors 30 has sensed the presence of an object, such as a finger, near their associated opening (step 52) represented by a light reading which is past the threshold value. As discussed above, the bandpass filter 31 associated with each of the sensors 30, prevents ambient light (or light which is not at the pre-determined modulated frequency) from passing through so that the sensor 30 obtains a reading of the amount of infra-red light to determine if the associated key has been pressed. Constant checks are performed to determine when a key selection is sensed (step 54). If no key selection has been sensed (step 56), the scanning module 38 continues to scan until it senses that one of the set of sensors 30 has created a signal indicating that it has sensed a change in the amount of infra-red light being sensed thereby bypassing the threshold value (step 58). This signal, which preferably includes an identification as to which key has been selected, is then transmitted to the processor 34. Upon receipt of this signal, the processor 34 proceeds to enter the interrupt table 36 to interrupt all applications (step 60) executing on the processor 34 so that the selected key may be entered into the memory 40 (step 62). After the selected key has been entered into memory 40, the interrupt is ended (step 64) and the applications continue executing while the processor 34 returns to scanning the sensors (step 52) for further key selections. This process is continued until the mobile communication device 10 is turned off.

Figure 4B:
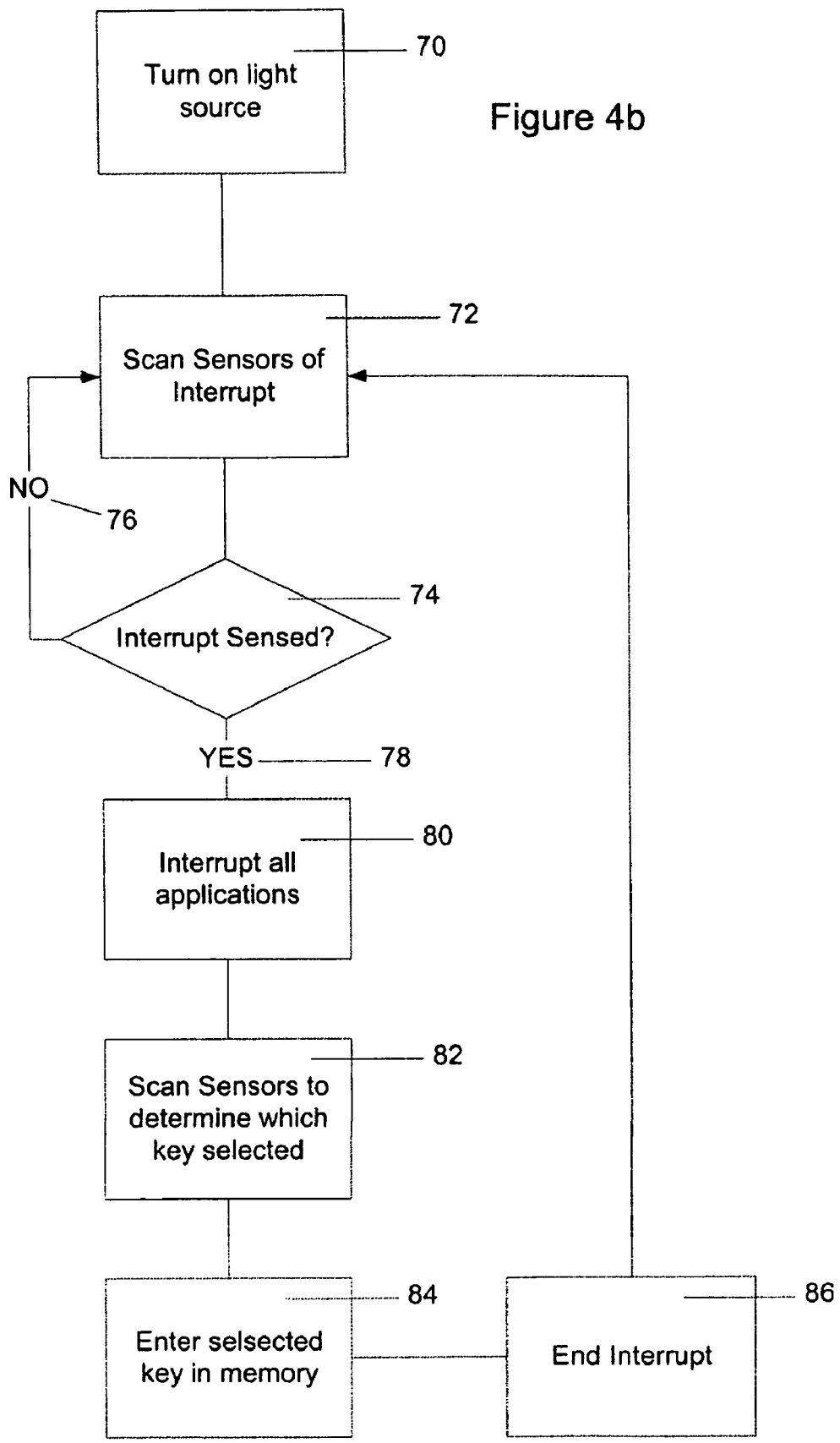
FIG. 4b is a flowchart of a second embodiment of a method of using the keyboard of FIG. 2.

In another embodiment of a method, as shown in FIG. 4b, after the mobile communication device 10 is turned on, thereby activating the light source 42 (step 70), the processor 34 scans the set of sensors 30 (via the scanning module 38) for an interrupt signal (step 72). In this method, if a sensor 30 senses a change in the amount of light being sensed (i.e. passes the threshold value), the sensor 30 produces an interrupt signal. The scanning module 38 continues to scan the sensors until the interrupt signal is sensed (step 74). If no interrupt signal is sensed (step 76), the scanning module continues to scan (step 72). However, once an interrupt signal is sensed (step 78), the processor 34 enters the interrupt table 36 to interrupt all the applications currently executing on the processor 34 (step 80). The scanning module 38 then scans each of the sensors 30 to determine which of the sensors produced the interrupt signal (step 82). Once this has been determined, the key associated with the sensor requesting the interrupt is entered into the memory 40 (step 84) and the interrupt table exited (step 86) so that the applications may return to their previous state and continue executing. The processor 34 then returns to scanning the sensors for the next interrupt signal (step 72).

As discussed above, the keyboard preferably includes one piezo-transducer for the set of sensors to provide a tactile response to the user's finger so that the user is provided with a keyboard-like feel when they press one of the keys on the cover. However, it will be understood that two transducers may be provided with one at opposite sides of the mobile communication device. Furthermore, a plurality of transducers, such as one under each of the sensors, is contemplated, however this decision is generally based on the overall size of the device. It is understood that less transducers are preferred as this assists in decreasing the overall weight and size of the device.

In another embodiment, the bandpass filter may be a programmable filter and may also be implemented in software.

In an alternative embodiment, the light source may be a light source which provides visible light such as a back-light, which is used in current mobile communication devices. In order to sense the visible light, the light is modulated to co-operate with the characteristics of the bandpass filters associated with the sensors. This provides an added advantage of saving battery power since there is no need for a separate light source to operate the keyboard.

Alternatively, each row of keys may be set up in its own light pipe rather than having a single light pipe encompassing all of the keys.

The above-described embodiments are intended to be examples only. Alterations, modifications and variations may be effected to the particular embodiments by those of skill in the art without departing from the scope of the invention, which is defined solely by the claims appended hereto.

What is claimed is:

1. A keyboard for a handheld electronic device, comprising:
    a light source for providing light;
    a plurality of keys;
    a plurality of sensors, each of the plurality of sensors in a one-to-one relationship with one of the plurality of keys, for sensing an amount of light in its proximity; and
    at least one light pipe, housing the plurality of sensors, for receiving and delivering the light to the sensors; and
    flat cover having a plurality of openings, each of the openings associated with one of the plurality of sensors wherein the associated sensor is in direct vertical alignment with a respective opening such that coverage of one of the openings by a user's finger causes said light to be deflected off the finger towards the associated sensor.

2. The keyboard of claim 1 wherein when a sensor senses the amount of light to be above a threshold value, the sensor indicates the user's intention to select that key.

3. The keyboard of claim 2 further comprising:
    at least one transducer for providing a tactile response to a user when one of the keys is selected.

4. The keyboard of claim 3 comprising two transducers.

5. The keyboard of claim 4 wherein the transducers are placed at opposite ends of the keyboard.

6. The keyboard of claim 3 wherein the at least one transducer is a piezo-electric transducer.

7. The keyboard of claim 2 further comprising:
    a processor for storing and processing selected keys.

8. The keyboard of claim 7 wherein the processor further comprises:
a scanning module for scanning the sensors to determine when a key has been selected; and
memory for storing the selected key.

9. The keyboard of claim 8 further comprising an interrupt table for interrupting applications executing on the processor so that the selected key can be stored into memory.

10. The keyboard of claim 1 wherein the light source provides an infra-red light or a visible light.

11. The keyboard of claim 10 wherein the infra-red light or visible light is modulated to produce a modulated light at a predetermined frequency.

12. The keyboard of claim 11 further comprising:
a plurality of bandpass filters, each associated with one of the plurality of sensors, for filtering out ambient light from the modulated light being delivered to the sensors.

13. The keyboard of claim 1 further comprising:
identifiers for identifying the keys of the keyboard.

14. The keyboard of claim 1 wherein the cover is transparent.

15. The keyboard of claim 14 wherein the cover further comprises key lettering on a top surface of the openings to indicate the key associated with the opening.

* * * * *